(12) United States Patent
Kissel

(10) Patent No.: US 7,918,002 B2
(45) Date of Patent: Apr. 5, 2011

(54) TUBING DISCONNECT TOOL AND A METHOD OF DISCONNECTING TUBING

(76) Inventor: Craig Kissel, Washington, MO (US)

( * ) Notice: Subject to any disclaimer, the term of this patent is extended or adjusted under 35 U.S.C. 154(b) by 717 days.

(21) Appl. No.: 11/262,569

(22) Filed: Oct. 31, 2005

(65) Prior Publication Data

US 2007/0096463 A1    May 3, 2007

(51) Int. Cl.
B25B 27/14    (2006.01)
(52) U.S. Cl. ............................... 29/237; 29/239; 29/276
(58) Field of Classification Search .................. 29/237, 29/700, 239, 270, 271, 276; 248/441.1, 473, 248/175
See application file for complete search history.

(56) References Cited

U.S. PATENT DOCUMENTS

| | | | |
|---|---|---|---|
| 960,193 A | 5/1910 | Peterson | |
| 1,454,783 A * | 5/1923 | Yetter | 24/710.5 |
| 2,501,519 A * | 3/1950 | Hosey | 24/703.3 |
| 3,833,197 A * | 9/1974 | Dyke | 248/441.1 |
| 4,237,614 A * | 12/1980 | Williams | 33/501 |
| 4,261,629 A * | 4/1981 | Reynolds et al. | 439/82 |
| 4,530,142 A | 7/1985 | Schiffer | |
| 4,613,108 A * | 9/1986 | Sundstrom et al. | 248/497 |
| 4,637,632 A * | 1/1987 | Rubash et al. | 281/45 |
| 4,889,006 A * | 12/1989 | Kolinske et al. | 74/502.4 |
| 5,267,383 A | 12/1993 | Sawdon | |
| 5,405,019 A * | 4/1995 | Cross | 211/42 |
| 5,490,310 A | 2/1996 | Schleicher | |
| 5,495,651 A | 3/1996 | Tsuha | |
| 5,611,189 A * | 3/1997 | Fleck | 52/702 |
| 5,683,120 A | 11/1997 | Brock et al. | |
| 5,695,172 A | 12/1997 | Hreha | |
| 5,875,535 A | 3/1999 | Canoy | |
| 5,957,819 A * | 9/1999 | Cortesi | 482/121 |
| 6,409,152 B1 | 6/2002 | Bagley | |
| 6,508,440 B2 * | 1/2003 | Schmidt | 248/62 |
| 6,745,989 B2 * | 6/2004 | Domasin | 248/465.1 |
| 6,886,229 B1 | 5/2005 | Wilson | |
| 6,913,246 B1 | 7/2005 | Skach | |
| 2003/0213887 A1 * | 11/2003 | Domasin | 248/473 |
| 2007/0096463 A1 | 5/2007 | Kissel | |
| 2007/0145741 A1 | 6/2007 | Kissel | |

* cited by examiner

*Primary Examiner* — Lee D Wilson
(74) *Attorney, Agent, or Firm* — Polster, Lieder, Woodruff & Lucchesi, L.C.

(57) ABSTRACT

A tubing disconnect tool and a method of disconnecting tubing. A disconnect tool for disconnecting a tubing end which is inserted within a collet of a fitting comprises a first plate member, a second plate member and bias member. The first plate member has a first front portion, a first rear portion and a first middle portion. The first plate member further has a channel disposed within the first middle portion. The second plate member has a second front portion, a second rear portion and a second middle portion. The second plate member also has a second channel disposed within the second middle portion. The bias member connects together the first plate member and the second plate member such that the bias member spaces the first plate member to attach to the fitting and spaces the second plate member to contact an outer collet surface of the collet wherein the first channel is configured to engage an engagement surface of the fitting and the second channel is configured to contact the outer collet surface in order to force the outer collet surface against the fitting to release the tubing end.

3 Claims, 3 Drawing Sheets

TUBING DISCONNECT TOOL AND A METHOD OF DISCONNECTING TUBING

CROSS-REFERENCE TO RELATED APPLICATIONS

Not Applicable.

STATEMENT REGARDING FEDERALLY SPONSORED RESEARCH

Not Applicable.

BACKGROUND OF THE DISCLOSURE

This disclosure relates to generally to the field of specialty tools, and in particular, to a hand tool designed for disconnecting a tubing end from an associated fitting.

In the field of fluid fittings used in pneumatic and hydraulic systems, it is commonplace to employ rapid connect and disconnect fittings designed for use with nylon and other semi-rigid plastic tubing. One well-known example of such fittings is an "instant fitting".

Instant fittings of a manual "push-in" or "push-to-connect" variety are widely employed in a variety of pneumatic, hydraulic, and other fluid applications utilizing plastic tubing. For example, metal or polymeric fittings of such type are used as tubing connections for automotive, marine, industrial and machinery applications.

Such instant fittings customarily comprise a slotted collet received within a body of the fitting, wherein the body has a tapered shoulder cooperative with slope surfaces of the body such that one end of a semi-rigid plastic tubing is insertable through the collet and into the body. When the tubing is pulled in a withdrawal direction, or when the system is pressurized, the tubing draws the collet along the slope surfaces, causing a gripping ridge of the collet to grasp the tubing tighter, securing it firmly in the fitting.

To disengage the tubing from the instant fitting, it is customary to push the protruding end of the collet inwardly into the fitting body to expand the collet and disengage the plastic tubing from the slope surfaces of the body. The typical disconnect procedure has been to push the protruding end of the collet with a tool such as a wrench, or pliers. However, this disconnect procedure can be difficult and potentially injurious to service personnel since the tubing/fitting connection is typically positioned in a hard to reach and/or confined area. As such, manipulating the tool in such an area results in injured fingers, hand or forearms due to slippage of the tool. The procedure is also clumsy and the tool can damage/puncture the tubing during the disconnect procedure. Indeed, some fittings exist in locations so confined that one cannot gain access to them with traditional tools.

The foregoing as well as presently preferred embodiments of the present disclosure will become more apparent from the reading of the following description in connection with the accompanying drawings.

SUMMARY OF THE DISCLOSURE

The present disclosure relates to a disconnect tool that enables a one-handed disconnection of tubing from a fitting, wherein the tubing inserts within a collet of the fitting. The disconnect tool comprises a first plate member, a second plate member and bias member. The first plate member has a first front portion, a first rear portion and a first middle portion. The first plate member further has a channel disposed within the first middle portion. The second plate member has a second front portion, a second rear portion and a second middle portion. The second front portion further has a bevel surface and a second channel disposed within the second middle portion.

The bias member connects together the first plate member and the second plate member such that the bias member spaces the first plate member to engage to the fitting and spaces the second plate member to contact an outer collet surface of the collet wherein the first channel is configured to engage with an engagement surface of the fitting and the second channel is configured to contact the outer collet surface in order to axially drive the outer collet surface against the fitting to release the tubing end.

During use, the operator moves the disconnect tool in contact with the fitting, engages the first plate member with the groove and contacts the second plate member with the outer collet surface. Then, the second plate member is forced against the outer collet surface to release the tubing end from the collet.

BRIEF DESCRIPTION OF THE SEVERAL VIEWS OF THE DRAWINGS

In the accompanying drawings which form part of the specification.

Corresponding reference characters indicate corresponding parts throughout the several views of the drawings.

DESCRIPTION OF THE PREFERRED EMBODIMENT

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The present invention relates to a fitting assembly that enables a one-handed disconnection of tubing from fittings in a rapid, reliable, economical and safe manner. The disclosure herein is described in connection with a "push-in" instant fitting assembly particularly adapted for hydraulic and pneumatic applications utilizing plastic tubing having an outer diameter of from about ⅛-inch (3 mm) to ¾-inch (20 mm). It will be appreciated, however, that aspects of the present disclosure may find utility in any fluid conduit systems, whether for gases or liquids, which utilize any sized tubing of any material.

Figure 1:
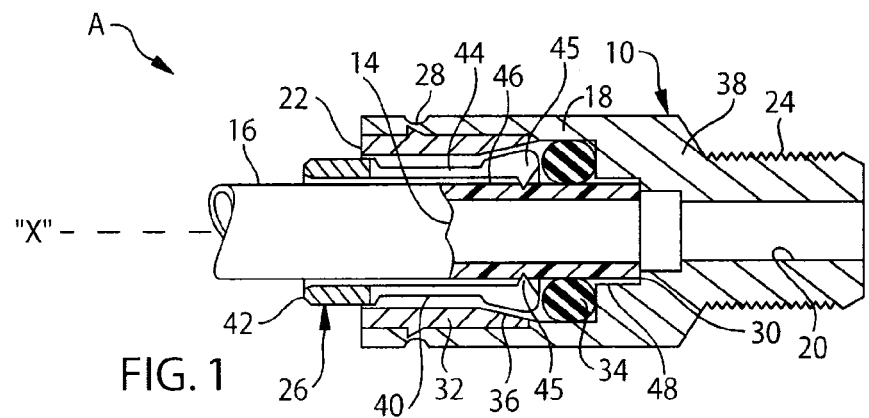
FIG. 1 is a cross sectional view illustrating a tubing end inserted within a collet of an instant fitting wherein the instant fitting includes an engagement surface around a body of the fitting.
Figure 2:
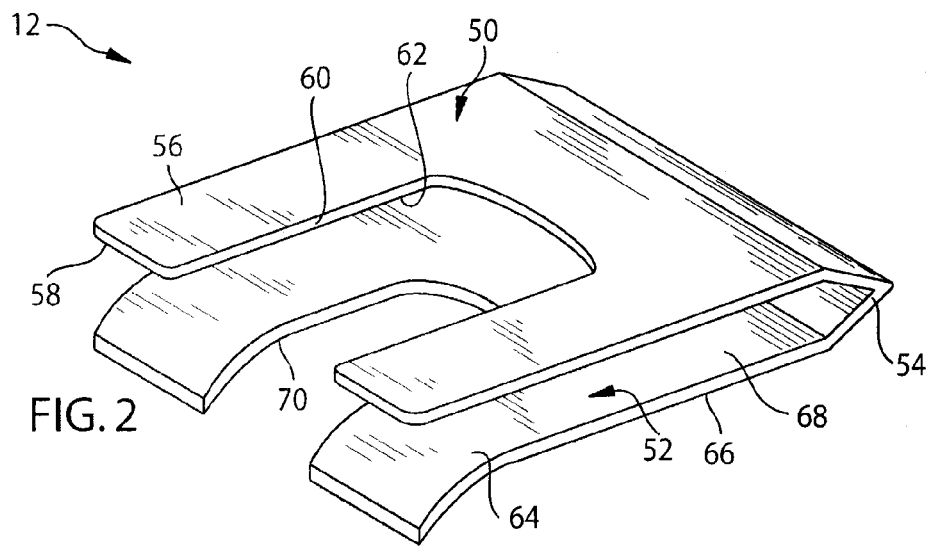
FIG. 2 is an isometric view of a disconnect tool constructed in accordance with and embodying the present disclosure.

Referring to the drawings, a fitting assembly A (FIG. 1) comprises a push-in instant fitting 10 and a disconnect tool 12 (FIG. 2). The fitting 10 according to the present disclosure is adapted for a releasable fluid connection with a distal end 14 of a length of tubing 16 having a wall of given outer diameter. Fitting 10 may be configured as a coupling, connector, union, adapter, tee, elbow, or cap. Furthermore, it may be embodied in a component of a machine, such as a valve. The fitting 10 includes a generally annular body 18, a bore 20, a forward end 22, a rear end 24 and a collet 26.

The body 18 extends axially along a central longitudinal axis "X" of fitting 10 from the open forward end 22 to the rear end 24. The body 18 positions the bore 20 along the central longitudinal axis X to extend between the open forward end 22 and the rear end 24. Body 18 further includes an engagement surface 28 positioned adjacent the forward end 22. In one embodiment, the engagement surface 28 lies along an annular groove positioned around the body 18. In another embodiment, the engagement surface 28 lies along a flange (not shown), which connects with the body 18. The flange may be removably attached to the body 18 or may be fixed to the body 18. In another embodiment, the engagement surface 28 lies along slots (not shown) positioned along sides of the body 18. In any event, the engagement surface 28 faces axially rearwardly toward the rear end 24.

The bore 20 leads up to an interior shoulder 30 and contains a collar 32 and an annular seal 34. The interior shoulder 30 is positioned between the forward end 22 and the rear end 24 while the collar 32 is positioned between the interior shoulder 30 and the forward end 22. The collar 32 includes slope surfaces 36 that contact the collet 26 as will be discussed.

For illustrative purposes, rear end 24 is shown to be configured as a nipple having external threads for coupling with a corresponding fastening member such as a female threaded end of an associated fitting (not shown). In this regard, a radial flange 38 configured as having hexagonal flat portions may be integrally formed about body 18 member intermediate the forward and rear ends 22, 24 thereof for engagement with a wrench or other tool during installation or connection. Other externally-threaded, as well as internally-threaded or unthreaded, embodiments of rear end 24 may be envisioned, however, depending on the desired configuration of fitting 10 as the connector, union, adapter, tee, elbow, cap, or the like.

The collet 26 comprises a generally tubular one-piece member 40 and an outer collet surface 42 in the form of a push ring. FIG. 1 illustrates an exemplary configuration of the collet 26. Collet 26 may comprise other configurations. As known, collet 26 comprises a means for holding a tubing end 16 within the fitting 10 and a means for releasing the tubing end 16 from the fitting 10. Collet 26 includes components which are external and internally positioned within the fitting 10. The surface 42 faces axially away from the end 28, and as such is presented in the axial direction opposite to that in which the engagement surface 28 is presented. The tubular member 40 coaxially inserts within the forward end 22 and the bore 20 while the outer collet surface 42 extends out of the bore 20 in a position adjacent to the forward end 22 of the body 18. The collet 26 is integrally formed as having a generally cylindrical wall portion 44 of a given diameter which is resiliently expandable against the slope surfaces 36 of the collar 32 to receive the distal end 14 of tubing 16 therethrough. The wall portion 44 extends axially along central longitudinal axis of the bore 20 between the forward end 22 and the rear end 24. The collet 26 can move axially of fitting 10 between the seal 34 and the slope surfaces 36 of the collar 32 by reason of axially directed slots.

The wall portion 44 includes fingers 45 which position against the slope surfaces 36 of the collar 32. The wall portion 44 positions against an outer wall 46 of the tubing 16 affecting the radially outward expansion of the wall portion 44 allowing for the insertion of the distal tubing end 14 pushed through the collet 26 from the open forward end 22 of the body 18. The seal 34 is interposed between the rear end 24 of the collet 26 and a forwardly presenting end wall of the bore 20 for effecting a fluid-tight engagement with the outer wall 46 of the tubing 16 and an inner wall 48 of the bore 20.

The disconnect tool 12 (FIGS. 2-4) comprises a first plate member 50, a second plate member 52 and a bias member 54 which connects together the first plate member 50 and the second plate member 52. The first plate member 50 has a first front portion 56, a first back portion 58 and a first middle portion 60. The first plate member 50 further has a first channel 62 (FIG. 2, 4) disposed within the first front portion 56 and the middle portion 60 and opens out of the former. In one embodiment, the first channel 62 is U-shaped.

Figure 3:
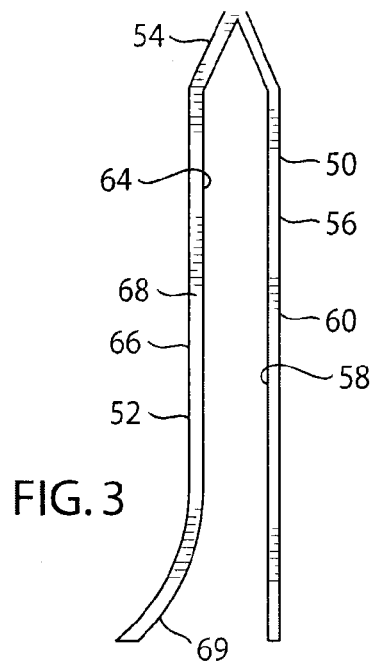
FIG. 3 is a side elevational view of the disconnect tool of FIG. 2 illustrating a first plate member, a second plate member and a bias member of the disconnect tool.
Figure 4:
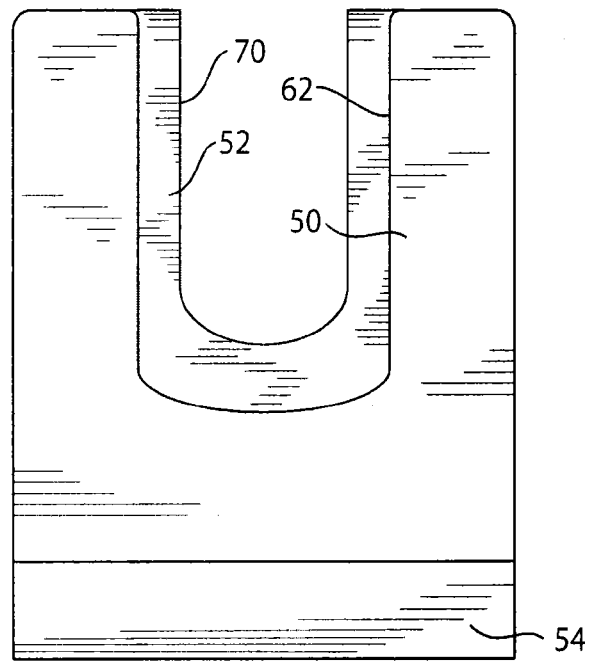
FIG. 4 is a bottom view of the disconnect tool of FIG. 2 illustrating channels of the first plate member and the second plate member.

The second plate member 52 has a second front portion 64, a second back portion 66 and a second middle portion 68 (FIGS. 2-4). The second front portion 64 also has a bevel surface 69 that curves outward from the second front portion 64. As shown in Figs, 2, 3 and 5, the bevel surface 69 is curved with a portion after the curve being planar. This bevel surface 69 functions as a cam as will be discussed. The second plate member 52 further has a second channel 70 (FIG. 2, 4) disposed within the second front portion 64 and middle portion 68 and opens out of the former. In one embodiment, the second channel 70 is U-shaped. As illustrated in FIG. 3, the first channel 62 and the second channel 70 are aligned opposite to each other in a parallel formation at a fixed distance. The fixed distance relates to the distance between the engagement surface 28 and the outer collet surface 42. In one embodiment, the first channel 62 is wider and longer than the second channel 70 (FIG. 4).

The bias member 54 comprises a V-shaped junction that acts as a spring between the first plate member 50 and the second plate member 52. The bias member 54 may be welded between the first plate member 50 and the second plate member 52. Alternatively, the first plate member 50, the second plate member 52 and the bias member 54 may be machined from the same piece of material. The bias member 54 spaces the first plate member 50 to engage the engagement surface 28 and spaces the second plate member 52 to contact the outer collet surface 42 in order to axially drive the collet 26 to release the tubing end 14.

Figure 5:
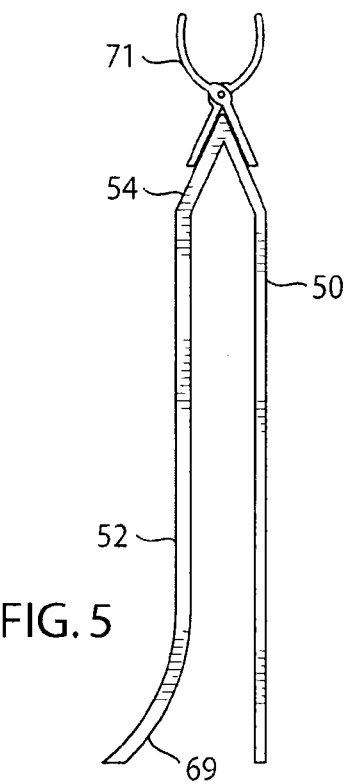
FIG. 5 is a side elevational view of another disconnect tool, constructed in accordance with and embodying the present disclosure, illustrating an operating handle connected with the bias member of FIG. 3.

In one embodiment, the disconnect tool 12 further includes a handle 71 (FIG. 5) connected to the bias member 54. In this embodiment, the handle 71 has ends that connect with the bias member 54. The handle 71 may removably connect with the bias member 54 or the handle 71 may be fixed to the bias member 54. Upon activation of the handle 71, the handle 71 moves the ends to crimp or pressure the bias member 54. In one embodiment, the handle 71 comprises a tool such as but not limited to a caliper or a pair of pliers.

Figure 6:
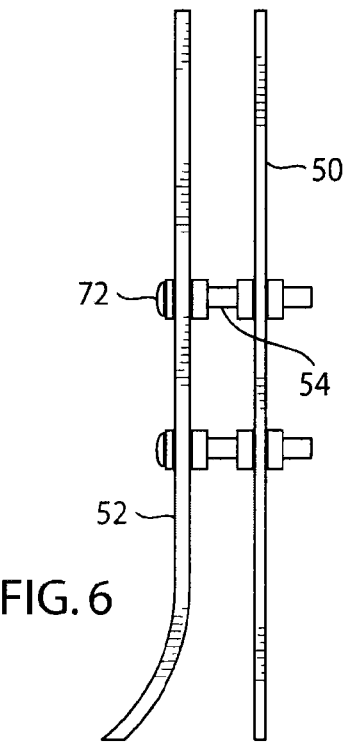
FIG. 6 is a side elevational view of another disconnect tool, constructed in accordance with and embodying the present disclosure, illustrating an adjustable bias member.

In another embodiment, the bias member 54 (FIG. 6) comprises a plurality of fasteners 72 that connect together the first plate member 50 and the second plate member 52 wherein the bias member 54 axially adjusts the first plate member 50 and the second plate member 52 with respect to each other. The bias member 54 axially adjusts the first plate member 50 and the second plate member 52 to match a distance between the engagement surface 28 of the body 18 and the outer collet surface 42.

For assembly, as the tubing 16 is inserted into the fitting 10, the distal end 14 of the tubing 16 first is passed through grip edges of the wall portion 44 of the collet 26, segments of which expand to resiliently capture and hold the outer wall 46 of the tubing 16, and then through the seal 34 which provides a leak-proof seal 34 against the outer wall 46 of the tubing 16. The advancement of the tubing 16 into the open forward end 22 of the fitting 10 is continued until positively stopped by the interior shoulder 30 of the bore 20.

Upon the pressurization of the tubing 16, or as the tubing 16 is pulled or otherwise placed in tension by a generally forwardly directed force, the collet 26 is moved forwardly within the tubing 16. This movement is delimited, however, by shoulders of the wall portion 44 being made to abuttingly contact the slope surfaces 36 of the body 18 in a force transmitting engagement for applying a radially-inwardly directed force to the collet segments and the grip edges thereof. Once the semi-rigid plastic tubing 16 is insertable into fitting 10 to make the sealed connection with the bore 20, the collet 26 flexes radially outwardly to allow grip edges to expand during such tubing insertion. In this way, the grip of the collet 26 is thereby tightened about the outer wall 46 of the tubing 16 preventing the removal of the tubing 16 from the fitting 10.

For disassembly, the tubing 16 may be released from the fitting 10 by pushing the collet 26 further into the body 18 and bottoming the tubing 16 against the interior shoulder 30 to effect the repositioning of the collet 26 within the bore 20. In such position, the collet 26 segments again may be expanded to release the tubing 16. In this regard, the outer collet surface 42 may be configured as an annular ring that may be pushed axially inwardly for advancing the collet 26 and tubing 16 within the body 18.

As indicated previously, hitherto in order to disconnect tubing 16 from fitting 10, the procedure used is to grip tubing 16 with one hand and, by means of a wrench or other tool grasped in the other hand, to push the collet 26 to displace it from the slope surfaces 36, thereby allowing the tubing 16 to be drawn out of the fitting 10.

Figure 7:
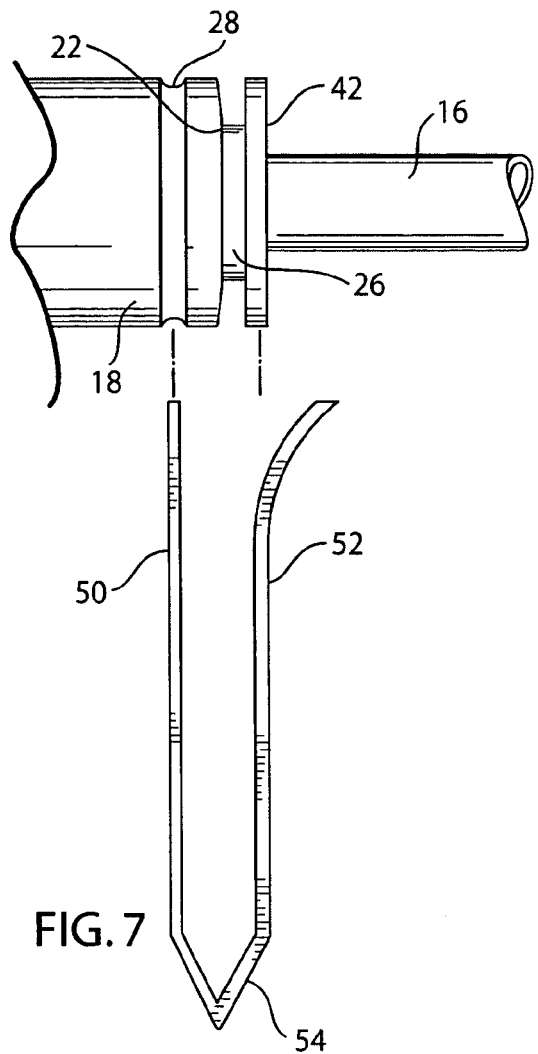
FIG. 7 is a cross sectional view of the disconnect tool separated from the tubing/fitting connection illustrating the tubing end locked within the fitting.
Figure 8:
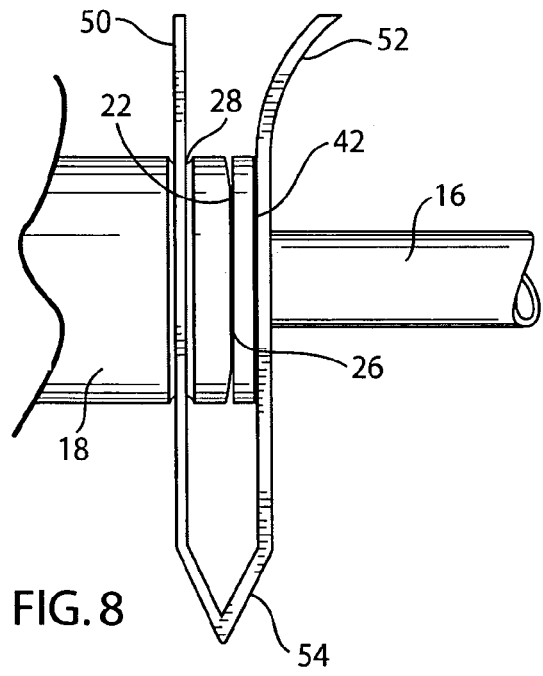
FIG. 8 is a cross sectional view illustrating the disconnect tool engaged with the engagement surface of the fitting and the disconnect tool contacting the collet and further illustrating the tubing released from the fitting.

In accordance with the present disclosure, the disconnect tool 12 (FIGS. 7 and 8) now enables a much more rapid and one-handed disconnection of tubing 16 from fitting 10, by operation of the disconnect tool 12. To withdraw the tube 16 from the fitting 10, the collet 26 must retract slightly into the fitting body 18 to the extent that the fingers 45 with the collet 26 expand outwardly away from the tube 16 and thus release the grip on the tube 16. During operation, the fitting 10 positions the engagement surface 28 for access by the operator, wherein the engagement surface 28 is positioned adjacent to the forward end 22 and at a distance from the outer collet surface 42. To this end, the tool 12 is positioned along the side of the fitting 10 with the channel 62 and its first plate member 50 aligned with the groove, or other configuration that lies behind the engagement surface 28 of the body 18 and with the channel 70 and its second plate member 52 aligned with the tube 16. With the tool 12 so positioned, it is advanced radially toward the fitting 10, so that the first plate member 50 fits at the entrance to its channel 62 while the second plate member 52 fits around the fitting 10 at the entrance of its channel 72 which fits around the tube 16. Moreover, the second plate member 52 lies along the margins of its channel 72 to position behind the engagement surface 28 on the body 18, whereas the beveled surface 69 on the second plate member 52 fits over the outer collet surface 42.

The operator then engages the first plate member 50 with the engagement surface 28. Engaging the first plate member 50 with the engagement surface 28 comprises sliding the engagement surface 28 within the first channel 62 of the first plate member 50. As noted, the operator also contacts the second plate member 52 with the outer collet surface 42. Contacting the second plate member 52 with the outer collet surface 42 comprises sliding a portion of the tubing end 14 within second channel 70 of the second plate member 52. The bevel surface 69 of the second front portion 64 begins forcing the outer collet surface 42 as the tubing end 14 slides within the second channel 70. As the tool 12 continues to advance radially, the beveled surface 69 of the second plate member 52 functions as a cam and forces the collet 26 farther into the body 18, so that the fingers 45 with the collet 26 release the tube 16.

The operator forces the second plate member 52 against the outer collet surface 42 to release the tubing end 14 from the collet 26. Pressuring the second plate member 52 against the outer collet surface 42 comprises moving the outer collet surface 42, via the second plate member 52, in contact with the fitting 10. Accordingly, as the plate 50 slides farther into the engagement surface 28 on the body 18, the bevel surface 69, functioning as a cam drives the collet 26 axially inwardly so that the collet 26 releases the tubing 16. Engaging the first plate member 50 with the engagement surface 28 resists movement of the second plate member 52 such that the engaged first plate member 50 provides a fixed resistance position for the disconnect tool 12. When the tool 12 is advanced to its fullest extent, it retains the collet 26 in its retracted position, and the tube 16 may be withdrawn from the fitting 10. Once the collet 26 releases the tubing 16, the operator easily pulls the disconnect tool 12 from the fitting 10 to separate the first channel 62 and the engagement surface 28 and to remove the second channel 70 from the outer collet surface 42.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A disconnect tool for disconnecting a tubing end which is inserted within a collet of a fitting, the tool comprising:
    a first plate member having a first front portion, a first rear portion and a first middle portion, the first plate member further having an U-shaped channel disposed within the first middle portion;
    a second plate member having a second front portion, a second rear portion and a second middle portion, the second front portion having a bevel surface positioned to face the first front portion wherein the bevel surface is curved with a portion after the curve being planar, the second plate member having an U-shaped second channel disposed within the second middle portion, the first channel being configured wider and longer than the second channel wherein the first channel is lower than the second channel configuring the channels in a non-planar configuration and being aligned opposite and parallel to the second channel; and
    a V-shaped bias member which connects together the first plate member and the second plate member such that the bias member spaces the first plate member to attach to the fitting and spaces the second plate member to contact an outer collet surface of the collet wherein the first channel is configured to engage an engagement surface of the fitting and the second channel is configured to contact the outer collet surface such that the bevel surface cams the outer collet surface in order to axially drive the outer collet surface against the fitting to release the tubing end wherein the bias member.

2. The disconnect tool of claim 1 wherein the bias member comprises a plurality of fasteners which axially adjust the first plate member and the second plate member with respect to each other.

3. A disconnect tool for disconnecting a tubing end which is inserted within a collet of a fitting, the tool comprising:
 a first plate member having a first front portion, a first rear portion and a first middle portion, the first plate member further having a channel disposed within the first middle portion;
 a second plate member having a second front portion, a second rear portion and a second middle portion, the second front portion having a bevel surface positioned to face the first front portion wherein the bevel surface is curved with a portion after the curve being planar, the second plate member having a second channel disposed within the second middle portion, the first channel being configured wider and longer than the second channel wherein the first channel is lower than the second channel configuring the channels in a non-planar configuration and being aligned opposite and parallel to the second channel; and
 a bias member which connects together the first plate member and the second plate member such that the bias member spaces the first plate member to attach to the fitting and spaces the second plate member to contact an outer collet surface of the collet wherein the first channel is configured to engage an engagement surface of the fitting and the second channel is configured to contact the outer collet surface such that the bevel surface cams the outer collet surface in order to axially drive the outer collet surface against the fitting to release the tubing end wherein the bias member.

* * * * *